United States Patent
Hartwell et al.

(10) Patent No.: US 9,237,177 B2
(45) Date of Patent: Jan. 12, 2016

(54) SYSTEMS AND METHODS FOR MEDIA STREAMING AND PRESENTATION IN AN APPLICATION ENVIRONMENT

(71) Applicants: Joshua Hartwell, Santa Monica, CA (US); Paul G. Bolten, Playa del Rey, CA (US); Sean Thompson, Westchester, CA (US)

(72) Inventors: Joshua Hartwell, Santa Monica, CA (US); Paul G. Bolten, Playa del Rey, CA (US); Sean Thompson, Westchester, CA (US)

(73) Assignee: GOSUB 60, INC., Santa Monica, CA (US)

(*) Notice: Subject to any disclaimer, the term of this patent is extended or adjusted under 35 U.S.C. 154(b) by 0 days.

(21) Appl. No.: 14/326,177

(22) Filed: Jul. 8, 2014

(65) Prior Publication Data
US 2015/0281307 A1    Oct. 1, 2015

Related U.S. Application Data

(60) Provisional application No. 61/972,189, filed on Mar. 28, 2014, provisional application No. 61/991,389, filed on May 9, 2014.

(51) Int. Cl.
*H04L 29/06* (2006.01)
*H04N 21/81* (2011.01)
*H04N 21/458* (2011.01)

(52) U.S. Cl.
CPC .......... *H04L 65/604* (2013.01); *H04L 65/4092* (2013.01); *H04L 65/80* (2013.01); *H04N 21/458* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 6,567,984 B1 | 5/2003 | Allport | |
| 8,701,145 B1* | 4/2014 | Berger et al. | 725/86 |
| 2002/0116520 A1* | 8/2002 | Hayden | 709/231 |
| 2003/0236907 A1* | 12/2003 | Stewart et al. | 709/231 |
| 2008/0249986 A1 | 10/2008 | Clarke-Martin et al. | |
| 2009/0172182 A1* | 7/2009 | Yoon | 709/231 |
| 2009/0210546 A1 | 8/2009 | Gindentuller et al. | |
| 2009/0328113 A1* | 12/2009 | van de Klashorst | 725/87 |
| 2011/0145858 A1* | 6/2011 | Philpott et al. | 725/32 |
| 2011/0225039 A1* | 9/2011 | Goldman et al. | 705/14.49 |
| 2012/0122438 A1* | 5/2012 | Renou | 455/414.4 |
| 2012/0158521 A1* | 6/2012 | McCullen | 705/14.69 |
| 2013/0229433 A1 | 9/2013 | Reitan | |
| 2014/0243098 A1* | 8/2014 | Yong et al. | 463/42 |

OTHER PUBLICATIONS

International Search Report mailed Jul. 16, 2015, corresponding to PCT/US2015/023016, filed Mar. 27, 2015.

* cited by examiner

*Primary Examiner* — Thomas Dailey
(74) *Attorney, Agent, or Firm* — Finnegan, Henderson, Farabow, Garrett & Dunner, L.L.P.

(57) ABSTRACT

A method for displaying data is disclosed. The method may include displaying an application on a mobile electronic communication device. The method may further include contacting at least one media server configured to store media data and receiving, at the mobile electronic communication device, first available media data from the at least one media server. The method may further include displaying the received available media data in a media stream within the application. The method may also include contacting, after a predetermined amount of time, the at least one media server and receiving, in response to the contacting, at the mobile electronic communication device, second available media data from the at least one media server. The method may further include displaying the second available media data in the media stream.

14 Claims, 11 Drawing Sheets

| Happy Friday! The National Day of Unplugging begins today! Here are some tips if | 👍 925  💬 158 | MAGAZINE \| EAT |
|---|---|---|
| USA TODAY A pregnant South Carolina Woman has been charged With three counts of | USA TODAY  👍 1K  💬 416 | 12 Ways to Move Grapefruit Beyond Breakfast |
| The New York Times Cooking with a curious fruit. | 𝕿  👍 396  💬 18 | By Mark Bittman  March 6, 2014  Salads, sauces and stir-fries can all benefit from a Bright hit of sweet and sour. |
| TechCrunch "Rewarding Mr. Snowden's Behavior in this way Encourages the very | TC  👍 48  💬 44 | Grapefruits are curious: There's a tad acknowledgement that they're delicious – people eat them plain for breakfast – but most cooks seem to have never used them as an ingredient in anything other than fruit salad. Why a food worthy of its own kind of spoon has been deemed largely unfit for savory cooking is beyond me. Grapefruits are tart, sweet |
| The Wall Street Journal Snakes were collected and Rolled before being put into The oven in an Indonesian | WSJ 125  👍 351  💬 94 | and fairly easy to work with; you still have to deal with peel and pith, but breeding has largely made seeds a thing of the past. |
| CNN "It states in the Bible not to Abuse a drug; it doesn't say You can't use it," says the | CNN  👍 2K  💬 451 | So how can we move beyond the squeeze of juice or the sprinkle of zest that we typically derive from citrus? Although it helps that you can get good-size bites out of a grapefruit, it's not only size that makes it different from most of its cousins. Its flavor bridges the gap between oranges and lemons (and lime), and so you can cook with it, because it's neither too sweet nor too sour. Chopped into chunks or sliced into supremes (more on that in a moment), |

FIG. 8D

SYSTEMS AND METHODS FOR MEDIA STREAMING AND PRESENTATION IN AN APPLICATION ENVIRONMENT

RELATED APPLICATIONS

This application claims the benefit of priority under 35 U.S.C. §119(e) of U.S. Provisional Patent Application Nos. 61/972,189, filed on Mar. 28, 2014, and 61/991,389, filed on May 9, 2014, the disclosures of both of which are incorporated herein by reference in their entireties.

TECHNICAL FIELD

This disclosure is generally directed to systems and methods for displaying data within an application or environment. More specifically, this disclosure relates to systems and methods for presenting social or other media in a media stream.

BACKGROUND

Many mobile electronic communication devices (including cellular phones, tablet computers, smart phones, and other handheld devices capable of communicating with a server) are capable of operating video game software, other game software, and application software. Most modern mobile electronic communication devices also allow users to download, purchase, or otherwise install new software (sometimes called "apps"). As mobile electronic communication device technology has advanced, the software available for these devices has become more robust. For example, most current mobile electronic communication devices include high-resolution color screens that can support games with detailed color graphics, and more content may generally fit onto these displays than on screens of older mobile devices. As a result, using application software on mobile electronic communication devices has become more user-friendly and efficient, and playing games on such devices has become a popular mode of entertainment.

In addition to the increased popularity of software on mobile electronic communication devices, social media networks and media publications, which may be designed for promotion through social media networks, have also experienced a surge of popularity in recent years. For example, social media networks, such as Facebook, Twitter, Instagram, Tumblr, LinkedIn, Vine, and Pinterest, are presently popular on the Internet. Likewise, publications for news, stocks, entertainment, and sports exist on the Internet, and several publications have been adapted for circulation and disbursement through social media networks or through various news feed mechanisms (such as, for example, RSS).

Despite the popularity of mobile application software and social networking, there is not currently a system or method for providing a way for a user to view and/or access a social media and/or other media stream within a third-party mobile application environment. For example, a user may want to be able to read updates from various social media networks without closing or switching out of a mobile game application. Switching between applications, screens, and/or windows to access various interfaces and information sources can be tedious and time consuming, and it also requires a user to exit or switch out of, or potentially minimize, a mobile application in order to access and view social and other media streams or information.

The recent surge in technical capabilities of mobile electronic communication devices has also spawned attractive new promotional possibilities. Because an increasingly large number of people worldwide own mobile electronic communication devices, many third parties may wish to advertise within the screen of a mobile electronic communication device. For example, when a user plays a game on a mobile electronic communication device, the user's full attention is generally directed to the screen of the mobile electronic communication device. Therefore, providing in-game advertising space in the palm of the user's hand is an attractive proposition for both buyers and sellers of the space. One problem with providing advertising space in the palm of a user's hand, however, is that in-game advertising often requires full use of the screen of the mobile electronic communication device. Therefore, a user is forced to switch between the game and other applications in order to, for example, access and view social and other media streams or information. Valuable advertising time is lost during this time when the user's full attention is diverted from the screen displaying the advertisements.

Further, advertisements within an application, such as game software, on a mobile electronic communication device may be presented in various ways. For example, the background of a game might contain a permanent or static advertisement for a third party. In most cases, this advertisement would generate revenue for the maker of the game, while also serving as a valuable promotional opportunity for the third party. However, such advertisements may lack the adaptability and customizability to be able to target particular users, as well as to be changed to reflect, for example, a different third party and/or an updated advertisement. Additionally, many advertisements are presently displayed as banner ads within mobile application software. Such advertisements may be time-cycled in order to display multiple advertisements in the same space over an elapsed period of time. Banner ads are often general in nature and are not targeted toward a specific audience. For example, such advertisements do not take a user's social media activity, mobile game activity, or device usage information into account when selecting the most applicable and/or effective advertisements to display to a particular user.

It is the object of the present disclosure to provide an integrated social media and other media stream, which may include advertisements, into the display of a mobile application to allow a user to simultaneously use the third party application and view and interact with social media. It is an additional object of the present disclosure to provide systems and methods for adaptively selecting social and other media posts as well as advertisements for display to a particular user.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

The present disclosure provides improved systems and methods for incorporating media streaming and presentation in a mobile device environment. More specifically, the present disclosure provides systems and methods for incorporating media feed streaming and presentation as an active "add-on" to an application environment that is generally intended for purposes other than media feed streaming and presentation. For example, consistent with the disclosed embodiments, systems and methods for displaying a social and/or other media stream within a game environment are disclosed. As used in the present disclosure, media streaming refers to relaying media information or data over a computer network. Also as used in the present disclosure, media presentation refers to the display of streamed media information or data. In one example, certain disclosed embodiments include systems and processes that may allow an aggregated social and other media stream or presentation to be displayed within an application environment, such as, for example, game software.

The disclosed embodiments may provide advantages to both users and mobile application providers. For example, aspects of the disclosed embodiments may provide a mobile device user with a more efficient way to both use mobile applications and to stay connected to social and other media. For the mobile application provider, there may be a financial benefit, such as, through increased advertising revenue, for providing a user with a more efficient way to access both the application and social and other media. Users will be able to remain in the application interface, and subjected to potential advertising displayed therein, for longer periods of time since they will not be forced to close or otherwise divert attention from the application (and the advertisements) when checking their social and other media. Users may also be willing to pay or pay more for a game or other application having such a social and other media interface, including being willing to pay or pay more for a game or other application having such a social and other media interface that does not include advertisements.

Other aspects are set forth below in this disclosure. For example, a method for displaying data is disclosed. The method may include displaying an application on a mobile electronic communication device. The method may further include contacting at least one media server configured to store media data and receiving, at the mobile electronic communication device, first available media data from the at least one media server. The method may further include displaying the received available media data in a media stream within the application. The method may also include contacting, after a predetermined amount of time, the at least one media server and receiving, in response to the contacting, at the mobile electronic communication device, second available media data from the at least one media server. The method may further include displaying the second available media data in the media stream.

The disclosed exemplary embodiments may also include a method for displaying data, including displaying a mobile electronic communication device environment on a mobile electronic communication device. The method may also include contacting at least one media server configured to store media data and receiving, at the mobile electronic communication device, first available media data from the at least one media server. The method may further include displaying the received first available media data in a media stream within the displayed environment. The method may also include contacting, after a predetermined amount of time, the at least one media server and receiving, in response to the contacting, at the mobile electronic communication device, second available media data from the at least one media server. The method may also include displaying the second available media data.

In accordance with other aspects of the disclosure a system for displaying data is disclosed. The system may be configured to display an application on a mobile electronic communication device. The system may further be configured to contact at least one media server configured to store media data and receiving, at the mobile electronic communication device, first available media data from the at least one media server. The system may further be configured to display the received available media data in a media stream within the application. The system may also be configured to contact, after a predetermined amount of time, the at least one media server and receiving, in response to the contacting, at the mobile electronic communication device, second available media data from the at least one media server. The system may further be configured to display the second available media data in the media stream.

In accordance with some embodiments of the present disclosure, a computer-readable medium is disclosed that stores instructions and that, when executed by one or more processor(s), causes the processor(s) to perform processes consistent with disclosed embodiments.

It is to be understood that both the foregoing general description and the following detailed description are exemplary and explanatory only. They are not restrictive of the disclosed embodiments, as claimed. Further, it is to be understood that the terms "new," "old," "older," and similar relational terms, in relation to media data are used to facilitate the description only, and are not limiting of the disclosure. For example, according to some aspects, new may refer to data received at a mobile electronic communication device after the old data. It does not necessarily temporally limit the generation or transmission of the new or old media data. New media data and old media data (or older media data) may also be generally referred to as first media data and second media data, respectively. For example, first media data may be received prior to the second media data. However, these terms are not intended to temporally limit the generation or transmission of the media data.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIGS. 8A-D are exemplary graphic displays for an exemplary video game interface with exemplary media streams and presentations.

DETAILED DESCRIPTION

Figure 1:
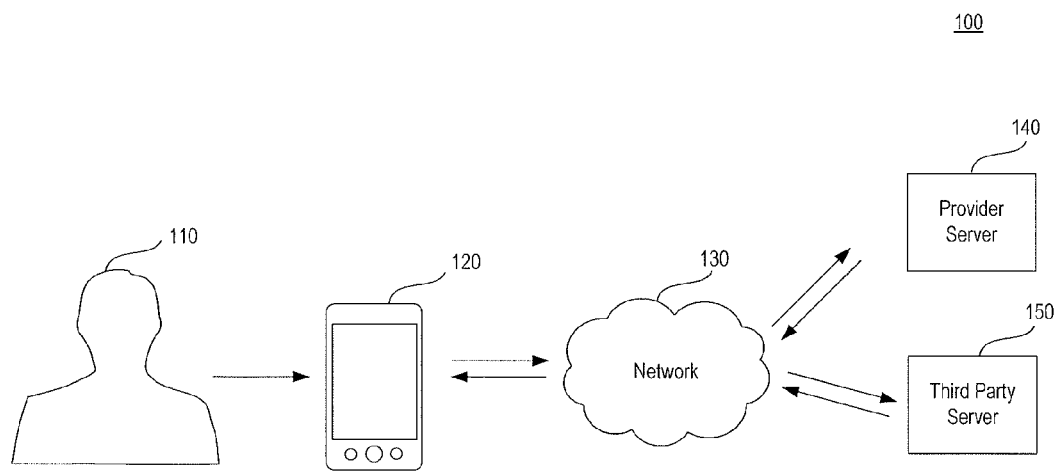
FIG. 1 is a block diagram of an exemplary mobile device system, consistent with the disclosed embodiments.

Reference will now be made in detail to exemplary embodiments, examples of which are illustrated in the accompanying drawings and disclosed herein. Wherever convenient, the same reference numbers will be used throughout the drawings to refer to the same or like parts.

It is to be understood that the terms "new," "old," "older," and similar relational terms, in relation to media data are used to facilitate the description only, and are not limiting of the disclosure. For example, according to some aspects, new may refer to data received at a mobile electronic communication device after the old media data. According to some embodiments, new media data may refer to media data with a received timestamp that occurred at a later time than the data already received. It does not necessarily temporally limit the generation or transmission of the new or old media data. According to some embodiments, new media data and old media data or older media data) may also be generally referred to as first media data and second media data, respectively. For example, first media data may be received prior to the second media data. However, these terms are not intended to temporally limit the generation or transmission of the media data.

Exemplary games and game software for use with exemplary embodiments of the present disclosure may include solitaire, blackjack, mahjong, minesweeper, and dominoes, as well as video-style games (such as, for example, race car driving games, darts games, and single-player or multi-player roleplaying games), other puzzle games, other card-based games, other casino-style games, "Sandbox" games, and any combination of these. Although certain exemplary embodiments may be described in relation to games and game software, the present disclosure is not limited to games and game software. The systems, methods, and principles of this disclosure may be implemented to any type of mobile application or device environment, such as, for example, blog readers, e-readers, web browsers, email, stock-trading or monitoring applications, news-reading applications, message applications, weather applications, shopping applications, "home" screens, operating system windows, video/audio media viewers (such as, for example, for movies, webclips, music videos, television programs, etc.), and/or productivity applications (such as, for example, word processing, spreadsheet, presentation, and/or calendaring applications), as will be appreciated by those of ordinary skill in the art.

Although certain exemplary embodiments may be described in relation to mobile or handheld electronic devices, the present disclosure is not limited to mobile or handheld electronic devices, but may be applicable to many different types of electronic devices. The systems, methods, and principles of this disclosure may be implemented to any type of electronic device capable of displaying social media and/or other media stream or presentation within or alongside application software, such as, for example, gaming (gambling) machines (such as, for example, video slot and video poker machines), internet television interface boxes (such as, for example, those known by the names and/or manufactured by AppleTV, Amazon Fire TV, Boxee, Google TV, Google Chromecast, TiVo, and Roku), and cable television interface or television converter boxes (such as, for example, those manufactured by Motorola, Scientific Atlanta, Cisco, Jerrold, General Instruments, and Pace for use by or with cable and other television providers such as, for example, Comcast, Time Warner, AT&T, Charter, DirectTV, and Dish), as will be appreciated by those of ordinary skill in the art.

Additionally, certain embodiments may also be implemented within an operating system operating on a user device. For example, it may be desirable to provide a built-in media stream or presentation within an operating system. In such an embodiment, the operating system itself creates, handles, and displays the media stream and/or presentation, without the need for the user to install, execute, or run a separate program.

Additionally, certain embodiments may also be implemented within a windowed device. For example, some user devices may be operating software that allows different applications to be open in different windows or zones of the viewable area. Embodiments consistent with the present disclosure may be implemented within each window or zone, which may enable a user to access the media stream or presentation without needing to open, close, or minimize windows or zones on the device. For example, if certain embodiments are implemented within an operating system, it may be desirable to further implement the media stream and presentation, consistent with disclosed embodiments, within each window or zone running within the operating system. In such examples, the stream presentation may be provided in a separate window, or in a specifically designated and/or dedicated portion of the screen. In certain embodiments, when visible or when minimized, an icon representing the stream may be visible on the screen, for example, along the bottom and on top of other open applications (such as, for example, in a toolbar, taskbar, notification panel or zone, or system icon/information panel or zone). In such instances, a user may open, minimize, maximize, and/or make changes to the stream window by selecting an icon visible on the screen.

As used herein, a server includes any remote system capable of receiving communication from a handheld device over a network, such as, for example, the Internet, intranet, local area network, wide area network, telecommunications network, and/or Ethernet.

According to some embodiments, the systems or methods disclosed may allow a software application company and/or provider, such as for mobile game software, to provide updated or aggregated content, including social media posts, other media posts, and/or advertisements, to a mobile electronic communication device for use in game software that operates on the mobile electronic communication device. The game may be more attractive to potential users and may provide additional revenue for the game provider, through an increase in user downloads, targeted advertisements, paid subscriptions or purchases of the game application (and any various in-app purchases), and advertising revenue spurred by the increase in users.

The game may be more attractive to third-party advertisers and provide promotional revenue for the game provider because it allows the user to consume social media without requiring the user to divert their eyes from the application in order to access social media. Certain embodiments may provide an avenue for selling time blocks of in-game advertising. Third parties may now have the option to advertise only to selected users, or only periodically, rather than permanently, within a game for a mobile electronic communication device. This flexibility may allow the negotiation of promotional contracts that involve less guess-work with respect to the placing of advertisements or virtual products within a game on a mobile electronic communication device. Further, an embodiment herein also provides promotional opportunities for third parties that could not previously afford to place advertisements within a game for a mobile electronic communication device. For example, while purchasing a promotional spot that lasts the lifetime of the game or that is shown to every viewer may not be feasible, it may be much cheaper to purchase a smaller block of time or an advertisement slot, including a slot for a specific target audience.

FIG. 1 shows a diagram of an exemplary mobile device system 100 that may be configured to provide a game along with an embedded social and other media stream or presentation within the game interface, consistent with the disclosed embodiments. The exemplary system may include a user device 120 interfacing with a provider server 140 and a plurality of third party servers 150 via network 130.

A user 110 may operate user device 120 to operate mobile software applications. User device 120 may be any form of computing or mobile electronic communication device. For example, user device 120 may be a cellular phone (iPhone®, Android phone, Windows® phone), a tablet computer (iPad®, Android Tablet, Microsoft Surface™, etc.), or a laptop, desktop, or portable computer. User device 120 may be capable of accessing network 130. Further, user device 120 may incorporate one or more display screens. For example, certain user devices 120 may implement a single display, whereas other user devices 120 may include a plurality of displays that work or operate in conjunction. In certain embodiments, user device 120 may be capable of caching information in memory or in permanent storage including but not limited to a database, as discussed in detail with regard to FIG. 2.

Network 130 may include, for example, the Internet, a private data network, a virtual private network using a public network, a WiFi network, a LAN or WAN network, a Bluetooth network, and/or other suitable connections that may enable information exchange. Alternatively or in addition, network 130 may include a cellular phone or data network, which may be provided by cellular phone service provider, such as, for example, Verizon, AT&T, Sprint, T-Mobile, or Metro PCS in the United States. In some embodiments, user device 110 may connect to an interface (not shown) that may, in turn, pass a request for data information to provider server 140 and/or third party server(s) 150. The interface may be part of provider server 140 or a separate device, depending on the embodiment. The interface may also include its own server and/or specialized firewall hardware. In addition, provider server 140 may actually be a plurality of servers.

Provider server 140 may be the server maintained and operated by the video game provider (not shown). The game provider may be the party who maintains, through server 140, for example, a web-based or application-based environment. The game provider may also be the party who provides a mobile application of a game to users. The game provider may provide the user with a mobile application through use of an online, download function. The provider may make the mobile application available for download by a user by uploading it to a web application store such as the Apple App Store, the GooglePlay™ store, the Apps for Windows store, the Amazon Appstore, or other online application provider website. User device 120 may, for example, download a mobile game application. It may alternatively, connect to a web-hosted game application though network 130.

In certain embodiments of the present disclosure, user device 120 may maintain a continuous link with provider server 140 while the game is operating. A continuous link may allow provider server 140 to continuously track the user's game play. In another embodiment, no continuous link exists, but provider server 140 may still track a user's game play. For example, user device 120 may periodically access provider server 140 to obtain updated information. Additionally, user device 120 may track or gather, and periodically or otherwise at a predetermined time or event, report game play statistics and/or device use statistics to provider server 140. Provider server 140 may gather the data provided by user device 140 and store the gathered data, for example, in memory 230 or in database 240. Reporting user statistics is discussed in further exemplary detail with respect to FIG. 7. Gathered data may be used by provider server 140 to determine which social and other media posts and advertisements to display to user 110 in the future. An example of determining which posts and/or advertisements to display is discussed in detail with respect to FIG. 6.

System 100 may additionally include one or more third party servers 150. Third party servers 150 may be operated by entities other than user 110 and the video game provider. For example, third party servers 150 may be operated by social media entities (such as, for example, Facebook, Instagram, Twitter, Tumblr, LinkedIn, Vine, Orkut, Renren, Sina, Weibo, and Pinterest), other media entities (such as, for example, New York Times, Huffington Post, Buzzfeed, FiveThirtyEight, Vox, and ESPN), and/or advertisers. Third party servers 150 may store social and/or other media data relevant to user 110. In some embodiments, third party servers 150 may transmit social and/or other media data, via network 130, to user device 120. User 110 may then access social and/or other media data on user device 120. In alternative embodiments, third party servers 150 may connect to provider server 140 via network 130. Third party servers 150 may then transmit social and/or other media data relevant to a particular user 110 to provider server 140. Provider server 140 may then store the media data, and/or transmit it, via network 130, to user device 120.

Figure 2:
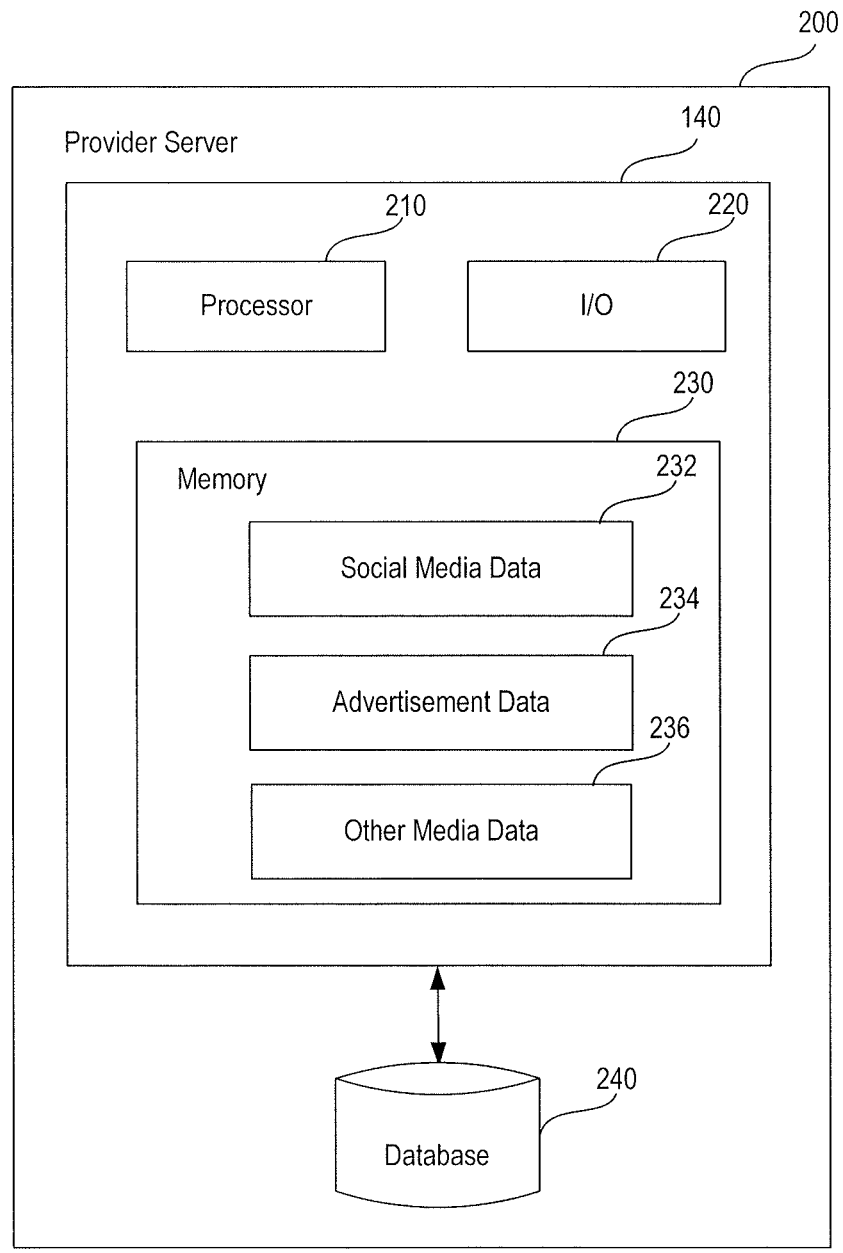
FIG. 2 is a block diagram of a computing system, consistent with the disclosed embodiments.

FIG. 2 shows a diagram of an exemplary computing system 200 illustrating a computing system configuration that may be associated with provider server 140, and user device 120, consistent with disclosed embodiments. In some embodiments, computing system 200 may have one or more processors 210, one or more memories 230, and one or more input/output (I/O) devices 220. In some embodiments, computing system 200 may take the form of a server, general purpose computer, a mainframe computer, laptop, smartphone, mobile device, or any combination of these components. In certain embodiments, computing system 200 (or a system including computing system 200) may be configured as a particular apparatus, system, and the like based on the storage, execution, and/or implementation of the software instructions that perform one or more operations consistent with the disclosed embodiments. Computing system 200 may be standalone, or it may be part of a subsystem, which may be part of a larger system.

Processor 210 may include one or more known processing devices, such as, for example, a microprocessor from the Pentium™ or Xeon™ family manufactured by Intel™, the Turion™ family manufactured by AMD™, or any of various processors manufactured by Sun Microsystems or Qualcomm, such as Snapdragon processors. Processor 210 may constitute a single-core or multiple-core processor that executes parallel processes simultaneously. For example, processor 210 may be a single-core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. In another embodiment, processor 210 may include a multiple-core processor arrangement (e.g., dual, quad core, etc.) configured to provide parallel processing functionalities to allow computing system 200 to execute multiple processes simultaneously. One of ordinary skill in the art would understand that other types of processor arrangements could be implemented that provide for the capabilities disclosed herein. The disclosed embodiments are not limited to any type of processor(s) configured in computing system 200.

Memory 230 may include one or more storage devices configured to store instructions used by processor 210 to perform functions related to the disclosed embodiments. For example, memory 230 may be configured with one or more software instructions, such as program(s) that may perform one or more operations when executed by processor 210. The disclosed embodiments are not limited to separate programs or computers configured to perform dedicated tasks. For example, memory 230 may include a single program that performs the functions of computing system 200, or could comprise multiple programs. Additionally, processor 210 may execute one or more programs located remotely from computing system 200. For example, user device 110, may, via computing system 200 (or variants thereof), access one or more remote programs that, when executed, perform functions related to certain disclosed embodiments. Processor 210 may further execute one or more programs located in database 240. In some embodiments, programs may be stored in an external storage device, such as a cloud server located outside of computing system 200, and processor 210 may execute programs remotely. It is understood that according to some embodiments processor 210 may include more than one processor that are each processor is configured to perform some of the steps described herein, such that together they perform the disclosed methods.

Programs executed by processor 210 may cause processor 210 to execute one or more processes related to providing a social and other media stream within a game interface as disclosed in the present embodiments.

Memory 230 may also store data that may reflect any type of information in any format that the system may use to perform operations consistent with the disclosed embodiments. For example, memory may store media data as received from third party servers 150. It may also store game-play statistics collected from user device 120. Additionally or alternatively, it may store device statistics about user device 120 itself (for example, phone number, GPS location, device type or model number, Apple IDFA, OpenUDID, MAC Address, whether on WiFi or cell tower, and wireless service provider or ISP). User statistics gathered from user device 120 may be stored in a user profile. Additionally, memory 230 may store user data such as, for example, geographic location, age, gender, type of games played, type of user device used, length of game play, in-app purchasing habits, win-loss ratio, time of day played, day of the week played, local weather, game personalization choices such as backgrounds and/or avatars, posts that have been expanded from the social and other media stream or presentation, or any other data relevant to the subject of the advertisement. Memory 230 may store instructions to enable processor 210 to execute one or more applications, such as game-play applications, data-processing applications, search-algorithm applications, and/or any other type of application or software. Alternatively, the instructions, application programs, etc., may be stored in an external storage (not shown) in communication with computing system 200 via network 130 or any other suitable network. Memory 230 may be a volatile or non-volatile, magnetic, semiconductor, tape, optical, removable, non-removable, or other type of storage device or tangible (i.e., non-transitory) computer-readable medium.

The application programs may be executed by processor 210 to operate and display an application environment, consistent with the disclosed embodiments. In some embodiments, there may be a single application environment that contains both a base application plus media streaming and presentation systems. In other embodiments, the media streaming and presentation systems may be performed in a separate application that runs simultaneously with the base application. In other embodiments, the media streaming and presentation is split up between being a separate application and being part of the base application. For example, the media streaming system may be a separate application, while the media presentation system may be integrated into the base application.

Memory 230 may include social media data 232. Social media data 232 may include information related to data received from various social media network providers. For example, social media data may include posts that user 110 would be able to access through their social networking accounts with various social network providers. Third party servers 150 may provide this information to provider server 140 via network 130. Provider server 140 may request data from third party servers 150, and transmit the data to user device 120 by provider server 140. Additionally or alternatively, social and other media data 132 may be transmitted to provider server 240 by user device 120. Alternatively social media data 232 may be stored in database 240 or in an external storage (not shown) in communication with computing system 200 via network 130 or any other suitable network.

Memory 230 may further include advertisement data 234. Advertisement data 234 may include information about particular advertisers who have purchased ad space with the game provider. For example, advertisement data 234 may include the actual advertisement (video, graphic, link, etc.) and/or a target profile. The target profile may include certain characteristics that the provider server may look for when choosing which users to display the advertisement. Target features may include, for example, location, phone type, game being played, social and other media networks used, whether the user has another specific game installed, whether the user has spent money in the game, how many times the user has viewed a particular advertisement, or any other data the provider server may have saved about a particular user 110. Advertisement data may additionally include advertiser account information, such as payment information, about the advertiser itself.

Memory 230 may further include other media data 236 which may additionally store data such as blog posts, news articles, stocks information, sports scores, weather information, television guides, celebrity news and gossip, posts from other players regarding the game currently being played, and/or videos that may be put in the social and other media stream or presentation. Other media data 236 may include data that user 110 has indicated, for example by clicking or selecting a button, that he or she wishes to view in his or her media stream or presentation. Additionally, other media data 236 may include data from default data sources that the game provider chooses to include in the media stream or presentation.

Processor 210 may analyze social media data 232 with reference to advertisement data 234. For example, processor 210 may analyze social media data 234 to determine if the related user possesses certain target features identified in advertisement data 234. Additionally, processor 210 may analyze certain social media data 232 to determine other social media posts that may be relevant to user 110. For example, processor 210 may analyze social media data 232 to determine trending topics contained therein. Processor 210 may then select additional social and other media posts that may also be relevant to and desired by the user.

Processor 210 may also analyze other media data 236 with reference to social media data 232. For example, processor 210 may analyze social media data 232 to determine if certain data stored in other media data 236 may be relevant to user 110. As discussed above, processor 210 may analyze social media data 232 to determine trending topics therein, and may then select other media data that may also be relevant and desired by the user for display to the user in the stream or presentation.

I/O devices 220 may be one or more device that is configured to allow data to be received and/or transmitted by computing system 200. I/O devices 220 may include one or more digital and/or analog communication devices that allow computing system 200 to communicate with other machines and devices, such as, for example, other components of exemplary system 100. For example, computing system 200 may include interface components, which may provide interfaces to one or more input devices, such as one or more keyboards, mouse devices, touchscreen interface, and the like, which may enable computing system 200 to receive input from an operator (not shown).

Computing system 200 may also contain one or more database(s) 240. Alternatively, computing system 200 may be communicatively connected to one or more database(s) 240. Computing system 200 may be communicatively connected to database(s) 240 through network 140. Database 240 may include one or more memory devices that store information and are accessed and/or managed through computing system 200. By way of example, database(s) 240 may include Oracle™ databases, Sybase™ databases, or other relational databases or non-relational databases, such as Hadoop sequence files, HBase, or Cassandra. Additionally or alternatively, computing system 200 may implement an SQL server database or SQL server database client. The databases or other files may include, for example, data and information related to the source and destination of a network request, the data contained in the request, etc. Systems and methods of disclosed embodiments, however, are not limited to separate databases. Database 240 may include computing components (e.g., database management system, database server, etc.) configured to receive and process requests for data stored in memory devices of database(s) 240 and to provide data from database 240.

Further, although sometimes discussed here in relation to provider server 140, it should be understood that variations of computing system 200 may be used by other components of system 100, including, for example, user device 120 and/or third party servers 150. Computing system 200 may be a single server or may be configured as a distributed computer system including multiple servers or computers that interoperate to perform one or more of the processes and functionalities associated with the disclosed embodiments.

Figure 3:
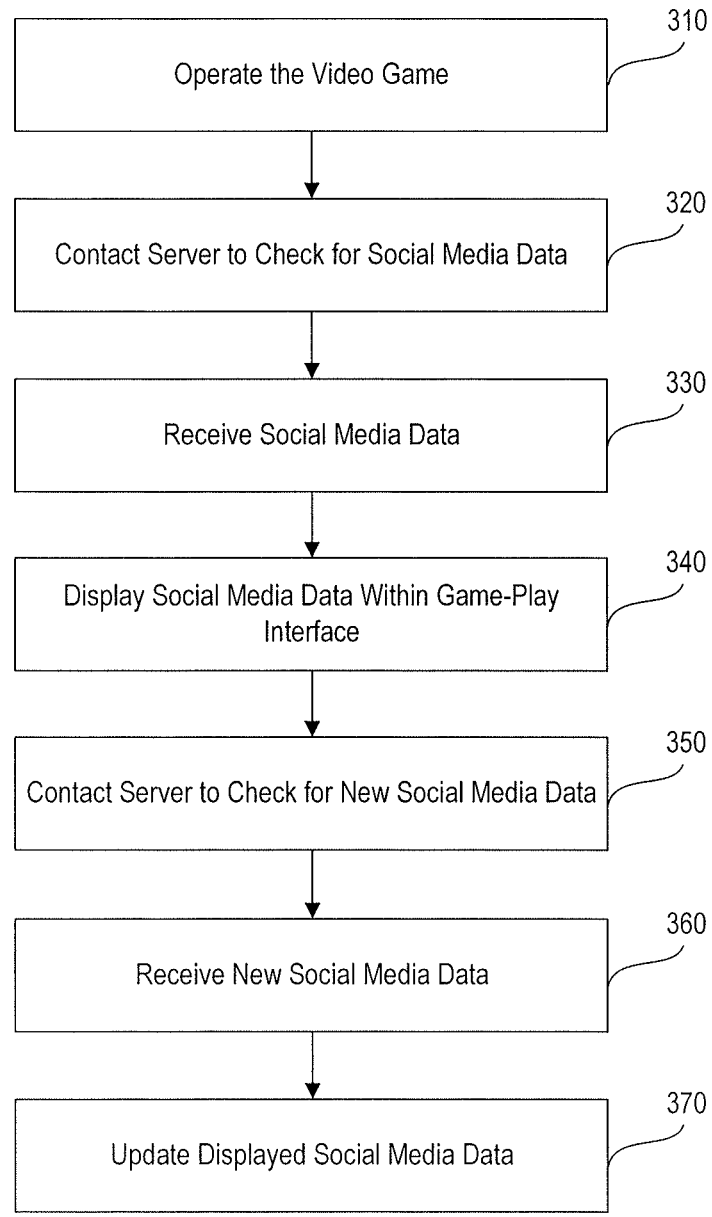
FIG. 3 is a flowchart of an exemplary process for providing a social media stream within a video game interface.

In some embodiments, at least one computing device in user device 120 may include the same or similar configuration and/or components of computing system 200. Computing system 200 when implemented in user device 120 may include hardware and/or software installed therein for performing methods and processes disclosed herein. Computing system 200 may, when implemented on user device 120, allow user 110 to influence the content displayed in their media stream or presentation. For example, user 110 may be able to select which social media networks, other media information or posts, and advertisements they wish to see displayed. In effect, user 110 may be able to directly influence the advertisement data 234, other media data 236, and social media data 232 stored in memory 230. FIG. 3 is an exemplary flow chart that includes steps taken by a mobile communication system to display a social media stream or presentation in accordance with some embodiments. System 100 operates a game at step 310. The game may be a game application that has been downloaded to user device 210. The game may also be a web-based game that user device 210 accesses through network 130.

In some embodiments, as user 110 interacts with a game and/or application, the media stream and/or presentation may be updated or modified to reflect the interaction. For example, if user 110 does something positive or noteworthy in a game (for example, in solitaire, moving an ace to the foundation or playing a special gold-backed card), provider server 140 or user device 120 may be configured to display to user 110, or to prompt user device 120 to display to user 110, a congratulatory message in the stream. The displayed message may be an application status. An application status may be, for example, a positive or noteworthy event within the game or application. For example, an application status may include, completing a level, unlocking a reward or bonus, defeating a monster, winning a game, paying a $100^{th}$ game, etc. Additionally, provider server 140 or user device 120 may present user 110 with a reward, feature update, and/or additional/modified game or application functionality (for example, a coin bonus or extra game play levels). Provider server 140 or user device 120 may also offer user 110 such a reward if user 110 selects, taps, or otherwise interacts with that post or message in the stream. Additionally or alternatively, if user 110 does something positive or noteworthy in the game, such as win or complete a level, user device 120 or provider server 140 may be configured to prompt user 110 to post the details of the win to one or more of the user's social network(s) (such as Facebook or Twitter). According to some embodiments, the details may be posted to the user's social network(s) after user device 120 receives an indication that the user wishes to post to the social network(s), such as through the user tapping button on a screen in response to the prompt. The details of the post by the user may be an application status.

In some embodiments, user 110 may also be able to interact with others (e.g., their friends) that are also playing the game. For example, if a user's social network connection (such as a Facebook "friend" or "followed" Twitter feed) posts to Facebook or Twitter, it may include a hashtag or other social media topic/trend indicator referencing a game played by user 110 or referencing a game that user 110 may be interested in playing. User 110 may select the post containing the hashtag or indicator, the game application will receive that information, and the game application will allow the user to play the referenced game. In some embodiments, such a post may also contain metadata or other hidden information that allows the game to receive additional information not apparent to the user and reflect a particular configuration, for example, a particular deal of cards to play in blackjack. In some embodiments, user 110 may receive a reward, feature update, and/or additional/modified game or application functionality (e.g., bonus coins or points) for selecting or otherwise interacting with the post.

In some embodiments, the media stream and/or presentation may present user 110 with information that might be used by the same or a different application program. For example, if a user is playing a game, and one of the user's social network connections posts to Facebook or Twitter including a hashtag or other social media topic/trend indicator referencing an event that user may wish to attend, user 110 may select the post containing the hashtag or indicator, the user's calendar application will receive that information, and the calendar application will place the event on the user's calendar. In some embodiments, such a post may also contain metadata or other hidden information that allows the application to receive additional information not apparent to the user and reflect a particular configuration, for example, the time, location, directions, details, and/or other attendees for the event.

At step 320, user device 120 may contact provider server 140 to check for social media data. In other embodiments, user device 120 may communicate with third party servers 150 directly, without going through provider server 140. Additionally or alternatively, provider server 140 or user device 120 may check contact third party servers 150 to check for social media data at this step. If social media data is found, either user device 120 or provider server 140 may receive the social media data from the source (step 330). Once social media data is received, for example, by provider server 140 or user device 120, it may be stored in memory 230 and/or in social media data 232. If social media data is received by provider server 140, it may then be transmitted to user device 120.

Social and other media data 232 may be displayed to user 110, via user device 120, at step 340. User device 120 may then display the data in a social media stream or presentation. The social media stream or presentation may combine social media data from a plurality of various social media networks. Additionally, user device 120 may display advertisements, articles, publications, and selected posts, determined by processor 210 as relevant to user 110 in the social and other media stream or presentation. User device 110 may display the social media stream or presentation within the video game interface. User device 110 may display the social media stream directly within the game play, so a user may view both the game and the social media stream or presentation without opening additional applications or windows. Therefore, the user will not have to close or minimize the game to view and interact with information within the social and other media stream or presentation.

Provider server 140 or user device 120 may, periodically, continuously, or manually based upon user control, update the social media stream or presentation to incorporate new posts. For example, at step 350, user device 120 may contact provider server 140 to check for new social media data. In certain embodiments, user device 120 may communicate with third party servers 150 directly. Additionally or alternatively, provider server 140 may contact third party servers 150 to check for new social media data at this step. If new social media data is found, either user device 120 or provider server 140 may receive the new social media data from the source (step 360). Once social media data is received, for example, by provider server 140, it may be stored in memory 230 and/or in social media data 232. Again, if new social media data is received by provider server 140, it may then be transmitted to user device 120. Once the new social media data is received, user device 120 may then update the social media stream or presentation to display the new social media data to user 110. User device 120 may poll for updates, receive "pushed" updates, or may check for updates at an interval of time set by provider server 140 or by user 110. For example, if the new stream data check is triggered based upon user control, user 110 may indicate that he or she wishes to check for or poll new updates by scrolling down on the social and other media stream. If user 110 scrolls to or near the end of the oldest data that has been acquired, a check for older data may be triggered. Older posts may be accessed, for example, with or without bound. Older posts may be accessed, for example, by scrolling/paging back in the media stream, or by other means. Caching of posts to the file system or a database on user device 120, provider server 140, or some combination of the two. In certain embodiments, caching posts may be incorporated in order to avoid unbounded memory use. Checks for new and old data could happen simultaneously if the stream is configured to poll for new media data periodically. Check for old data may also occur if the user scrolls towards the oldest data in the stream and triggers a check for old data. According to some embodiments, updates may also be received, for example, by "pushing" data from other devices, such as servers. Push updates may not require the user device to contact the provider servers.

In certain embodiments, updating the media stream may only occur manually. For example, a user may indicate, by interfacing with user device 120 that he wishes to have the media stream updated. In some embodiments, updating the media stream may only occur on a predetermined interval. In some embodiments, updating the media stream may occur based on a combination of automated updates on a predetermined interval and manual updates to the media stream. For example, a predetermined interval may be set, but the user may still have an option to update the media stream manually, such as by a refresh button displayed on user device 120.

Further, it should be noted that although the steps of the exemplary flowchart in FIG. 3 are discussed with relation to social media data, the same or similar steps may be implemented with relation to advertisement data 234 or other media data 236, or any combination of the social media data 232, advertisement data 234, and/or other media data 236. Additionally, it should be noted that the steps of the exemplary flowchart may alternatively be implemented entirely on user device 120, entirely on provider server 140, or any combination of the two.

Figure 4:
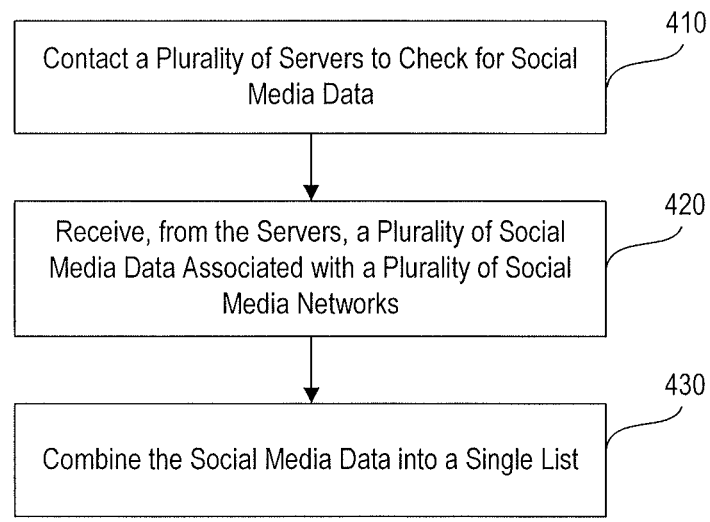
FIG. 4 is a flowchart of an exemplary process for receiving social media data.

FIG. 4 is an exemplary flowchart that includes steps taken by mobile communication system 100 to gather social media data. At step 410, provider server 140 or user device 120 may contact a plurality of third party servers 150. Third party servers 150 may be responsible for storing social media data that has recently been posted to the social media website or network that is maintained by the particular third party server 150. Provider server 140 or user device 120 may access the social media data stored in third party servers 150 that is relevant to a particular user 110. Provider server 140 then may check to see if third party servers 150 have any social media data related to the particular client 110.

If third party servers 150 indicate that they have social media data related to the particular client 110, they may then transmit the relevant social media data to provider server 140. In some embodiments, third party server 150 may transmit the relevant social data directly to user device 120, without going through server 140. In this way, provider server 140 or user device 120 may receive a plurality of social media data associated with various social media networks (step 420). In some embodiments, user 110 may indicate to provider server 140 which social media networks he or she would like to see in his or her social media stream or presentation. Provider server 140 may then only gather data from the third party servers 150 associated with the social networks the user has indicated.

At step 430, provider server 140 or user device 120 then combines the social media data into a single list. Because provider server 140 or user device 120 may be receiving social media data from a plurality of third party servers 150, processor 210 may organize and combine all the received data from the plurality of third party servers into a single comprehensive list of all data relevant to particular user 110. In some embodiments this list may be organized chronologically. The combining and organizing of social media data is discussed in detail with respect to FIG. 5. According to some embodiments, provider server 140 or user device 120 does not combine the social media data into a single list, but rather may be configured to provide separate social and other media streams or presentations for each individual source. For example, data from each individual third party server 150 may be displayed in separate media streams or presentations. For example, posts from Facebook may be contained in a separate stream or presentation than posts from Twitter. A user 110 may select to display a single stream or presentation, for example, by selecting or clicking on a particular stream or presentation or a symbol representing a particular stream. Additionally, in certain embodiments, user 110 may choose to combine the streams or presentations into a single stream or presentation, for example by deselecting a particular stream or presentation or a symbol representing a particular stream or presentation. Additionally media streams or presentations may be combined into categorized groupings. A user may, for example, indicate a category of media and/or media streams they wish to view. For example, a user may indicate that they wish to see only social media streams or presentations, or a user may indicate that they wish to see only news related media streams or presentations.

In certain embodiments each individual media stream or presentation may be color coded differently. For example, the Twitter media stream may be a different color than the Facebook media stream. Additionally, when displayed as a single media stream or presentation, posts from different media providers may be color coded based on the provider. For example, posts from Twitter may be a different color than posts from Facebook.

Additionally, provider server 140 or user device 120 may determine if there are duplicate posts. For example, the data received from third party servers 150 may contain the same post from multiple different servers 150. Provider server or user device 120 may conduct a comparison of the received data from each third party server 150 as the data is being combined. If provider server 140 or user device 120 contain the same post, that post may be displayed only once in the social or other media stream or presentation. For example, provider server 140 or user device 120 may eliminate duplicates from the social or other media stream or presentation.

Additionally or alternatively, provider service 140 or user device 120 may also determine if there are duplicate posts based on, for example, a user's multiple subscriptions to the same media channel. For example, a user 110 may subscribe through a social network, such as Facebook, to receive posts from a certain media source (e.g., New York Times). User 110 may also indicate within the application environment that they wish to receive media posts from the same media source (e.g., New York Times). Deduplication methods, as described above, may prevent the same post from the same media source from showing up in a user's social and other media stream or presentation multiple times. For example, provider server 140 or user device 120 may conduct a comparison of the various media source subscriptions. If provider server 140 or user device 120 contain multiple subscriptions to the same media source, posts from that source may only be displayed once in the social or other media stream or presentation. For example, provider server 140 or user device 120 may eliminate duplicates from the social or other media stream or presentation, and may allow the user to select a preference of from which media source the duplicate should be shown (e.g., from Facebook or from New York Times).

Further, it should be noted that although the steps of the exemplary flowchart in FIG. 4 are discussed with relation to social media data, the same or similar steps may be implemented with relation to advertisement data 234 or other media data 236, or any combination thereof. Additionally, the steps of this exemplary flowchart may be implemented solely on user device 120, solely on provider server 140, or on any combination of the two.

Figure 5:
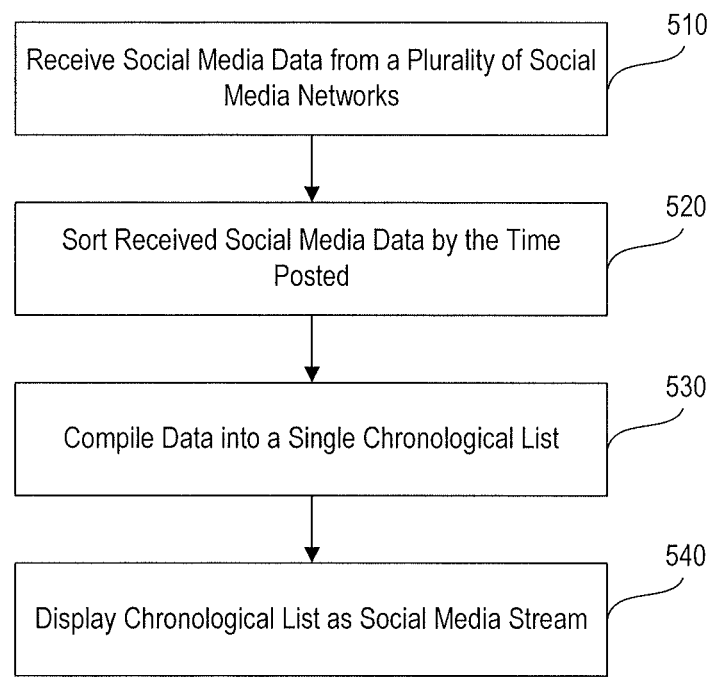
FIG. 5 is a flowchart of an exemplary process for organizing the received media data.

FIG. 5 is an exemplary flowchart that includes steps taken by mobile communication system 100 to aggregate social media data into a single social media stream or presentation. Aggregation of social media posts from a variety of social media networks eases the amount of effort user 110 must expend in order to review the social media posts relevant to him or her from a variety of social networks. At step 510, provider server 140 may receive social media data 232 from a plurality of social media networks. Data may be received continuously, or may be received at specific time intervals or upon certain events (such as, for example, scoring a certain number of points, completing a level, hand, or board within a game, moving from the menu system to the game, or uncovering a key object or gameplay piece within the game). The intervals and/or events may be set by provider server 140 or by user device 120, such that the game operator or user may define the style of data received. Third party servers 150 may transmit social media to provider server 140 or user device 120. Once received, provider server 140 or user device 120 may store social media data in memory 230.

At step 520, provider server 140 or user device 120 may sort the received social media data by the time it was posted. For example, social media posts contained in the received social media may include a timestamp. A timestamp may indicate the time at which the post was made on the social media network. Processor 210 may sort the social media data by organizing it chronologically by analyzing the timestamps on each post and ordering the posts accordingly.

In certain embodiments, social and other media posts may be sorted based on factors other than time. For example, social and other media data may be sorted based on popularity (e.g., "trending" topics) or relevance to a particular user 110. Further, in some embodiments, media providers may be able to pay more to have their posts and/or advertisements displayed at the top of the media stream or presentation.

Additionally, as described in detail with reference to FIG. 4, provider server 140 does not combine the social media data into a single list, but rather is configured to provide separate social and other media streams or presentations for each individual source. For example, data from each individual third party server 150 may be displayed in separate media streams or presentations. For example, posts from Facebook may be contained in a separate stream than posts from Twitter. A user 110 may select to display a single stream or presentation, for example, by selecting or clicking on a particular stream or presentation or a symbol representing a particular stream or presentation. Additionally, in certain embodiments, user 110 may choose to combine the streams or presentations into a single stream or presentation, for example by deselecting a particular stream or presentation or a symbol representing a particular stream or presentation.

At step 530, provider server 140 or user device 120 may compile the data into a single time-ordered list. Because each third party server 150 from which provider server 140 or user device 120 receives social media data may have a different stream velocity, or delay or lag in the posting and transmission of new social media data, there may be a delay between the sorting and compiling steps to ensure that all social media data from a given time period had been gathered and sorted before being displayed in the stream to user 110. For example, in some embodiments, receiving the social media data from a plurality of social media networks (step 510) may be a continuous process, and as social media data is continuously received, processor 110 may continuously sort the data by time posted (step 520). Then, periodically, processor 110 may compile the sorted social media data into a finalized, time-ordered list that user device 120 will then display to user 110. The final time-ordered list may be transmitted to user device 120 by provider server 140 after compilation.

Provider server 140 or user device 120 may further deal with different stream velocities when polling for older data by, for example, keeping a time-ordered list of incoming posts from each different media stream. Provider server 140 or user device 120 may, for example, receive different media streams from third party servers 150. Provider server 140 or user device 120 may then combine the data in chronological order as discussed above. In certain embodiments, provider server 140 or user device 120 may stop or pause combining the data from multiple media sources (e.g., third party servers 150) into the single list when one of the media sources runs out of data. Provider server 140 or user device 110 may buffer unmerged data from other media sources until the next time provider server 140 or user device 120 poll for old data. In some embodiments, provider server 140 or user device 120 may omit media sources with a sufficient buffer from the next old data poll when old data is polled for. This gives the streams that have extra data, such as those with lower stream velocities, a chance to consume extra data during the time-ordered merging process conducted by provider server 140 or user device 120, as described above, instead of continuously polling for additional data from the media sources and getting farther ahead.

In some embodiments, stream velocity has no effect on provider server 140 or user device 120 polling for new media data from the media sources (e.g., third party servers 150), whether user-triggered or periodically polled for. For example, all streams or media sources may poll for new media data simultaneously. For example, provider server 140 or user device 120 may simultaneously poll for new media data from all media sources simultaneously by communicating with third party servers 150 requesting all data from the time of the last data received for that particular stream or media source until the present. In some embodiments, received data from all sources may be merged into the time-ordered list and no buffering of new media data may be necessary to compensate for differing stream velocities.

Further, it should be noted that although the steps of the exemplary flowchart in FIG. 5 are discussed with relation to social media data, the same or similar steps may be implemented with relation to advertisement data and/or other media data, or any combination thereof. Additionally, the steps of this exemplary flowchart may alternatively be implemented solely on user device 120.

Figure 6:
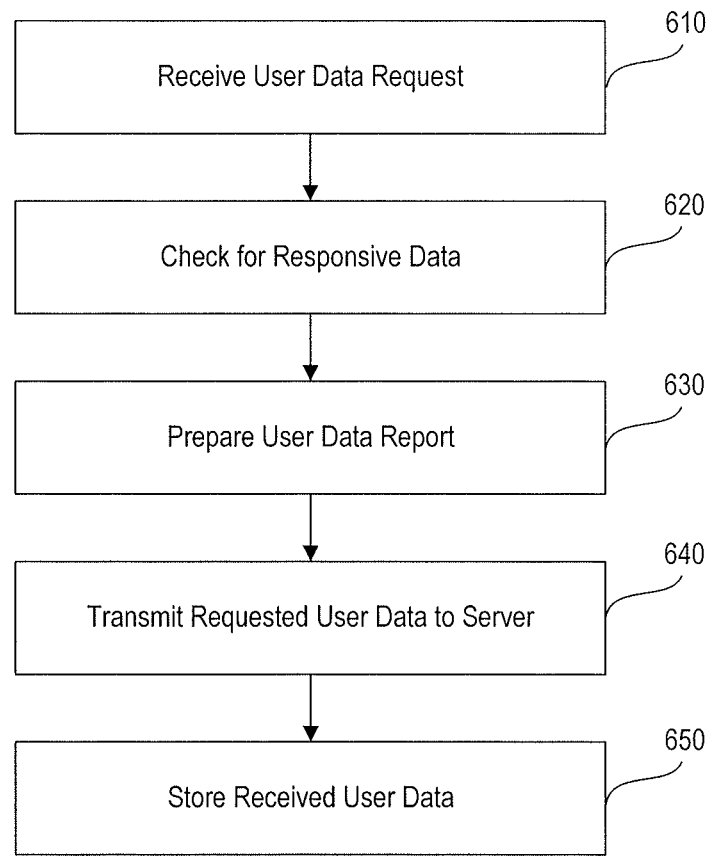
FIG. 6 is a flowchart of an exemplary process for transmitting and storing user data.

FIG. 6 is an exemplary flowchart that includes steps taken by a mobile communication system to report and store user statistics. At step 610 user device 120 may receive a request for user data from provider server 140. Alternatively, user device 120 may be configured to automatically send user data to server 140 at particular intervals. Additionally, an application operating on user device 120 may instruct user device 120 when to send user data to user device 120.

In certain embodiments, provider server 140 or user device 120 may request user data at certain time intervals which may be set by the game provider. Additionally, provider server 140 or user device 120 may have particular data points that it requests. For example, requested data may include geographic location, age, gender, type of games played, type of user device used, length of game play, in-app purchasing habits, win-loss ratio, time of day played, day of the week played, local weather, game personalization choices such as backgrounds and/or avatars, posts that have been expanded from the social and other media stream, or any other data relevant to the subject of the advertisement. These user data points may be stored on user device 120. After receiving the request for user data from provider server 140, user device 120 may check for responsive data (step 620). In certain embodiments, user device 120 may not receive a request for user data from provider server 140, but rather may check for the predetermined data to provider server 140 on certain time intervals without receiving a request. Checking for responsive data may include determining if new media data has been accumulated in the time since the last batch of user data was transmitted to provider server 140.

At step 640, if responsive user data was found in step 630, user device 120 may transfer user data to provider server 140. User device 120 may transmit the data via network 130. In certain embodiments, user device 120 may wait to transmit user data until a certain amount of new media data has accumulated. For example, user device 120 may wait to transmit game-play data regarding the user's game-play habits until the user has played the game for a certain length of time or a certain number of games. At step 650, provider server 140 may store the received user data. User data may be stored in memory 230. In certain embodiments, user data stored in memory 230 may be used to determine media posts relevant to user 110, or may be used to identify target features for advertising, as discussed in further detail with respect to FIG. 7.

Further, it should be noted that although the steps of the exemplary flowchart in FIG. 6 are discussed with relation to advertisements, the same or similar steps may be implemented with relation to social media posts and/or other media posts.

Figure 7:
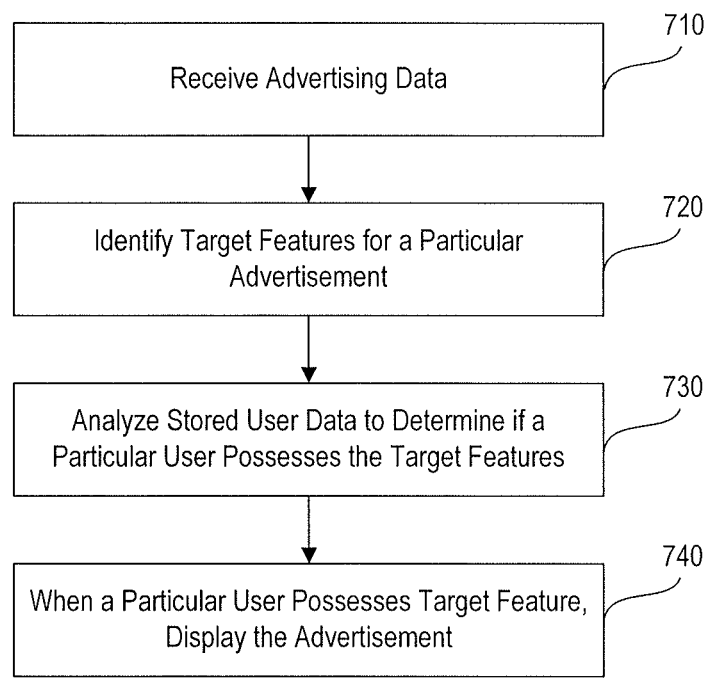
FIG. 7 is a flowchart of an exemplary process for selecting which media posts and advertisements to display in an exemplary media stream.

FIG. 7 is an exemplary flowchart that includes steps taken by a mobile communication system to determine which advertisements to display to user 110. Provider server 140 may be configured to selectively display advertisements to users. For example, one advertisement may be relevant to a particular user whereas another advertisement may not, and it may be beneficial to both user 110 and to the game provider to only display relevant advertisements to users.

At step 710, provider server 140 or user device 120 may receive advertising data. Advertising data may be transmitted to provider server 140 or user device 120 from various third party servers 150 that wish to have their advertisements displayed to users 110 that play or subscribe to the video game provider's games. Advertising data may include, for example, at least the advertisement and a target profile indicating at least one target feature for the target audience of the advertisement. Target features are identified from the advertising data at step 720. The target feature will indicate the type of user the advertiser is trying to target with the advertisement. For example, a target feature could be geographic location, age, gender, type of games played, type of user device used, length of game play, in-app purchasing habits, win-loss ratio, time of day played, day of the week played, local weather, game personalization choices such as backgrounds and/or avatars, posts that have been expanded from the social and other media stream, or any other data relevant to the subject of the advertisement.

Additionally or alternatively, advertising data including the target profile may be provided by provider server 140 or user device 120 to an advertising entity. The advertising entity may then determine an appropriate ad relevant to the particular user 110 based on the received information contained in the target profile. The advertising entity may then provide an appropriate ad they select to a particular user to server provider 140 or user device 120. Additionally, the advertising entity (e.g., a third party server 150), may provide a relevant advertisement directly to user device 120. In some embodiments, advertising may be independent of the gathering and receipt of any user demographic data.

At step 730, provider server 140 or user device 120 may analyze stored user data. User data may have been received across network 130 from user device 110, as discussed previously in relation to FIG. 1. User data may be stored in memory 230. Processor 210 may access stored user data related to a particular user 110 and analyze user data to determine if any of the particular user 110 possesses any of the target features identified in the advertising data. When a particular user possesses one or more of the target features, user device 120 may display the advertisement to user 110 (step 640). Processor 110 may transmit the advertisement determined to be relevant to user 110 to user device 120 via network 130 for display to user 110. If, the particular user does not possess any of the target features, the advertisement may not be displayed to the user.

Further, it should be noted that although the steps of the exemplary flowchart in FIG. 7 are discussed with relation to advertisements, the same or similar steps may be implemented with relation to social media data and/or other media data.

Figure 8A:
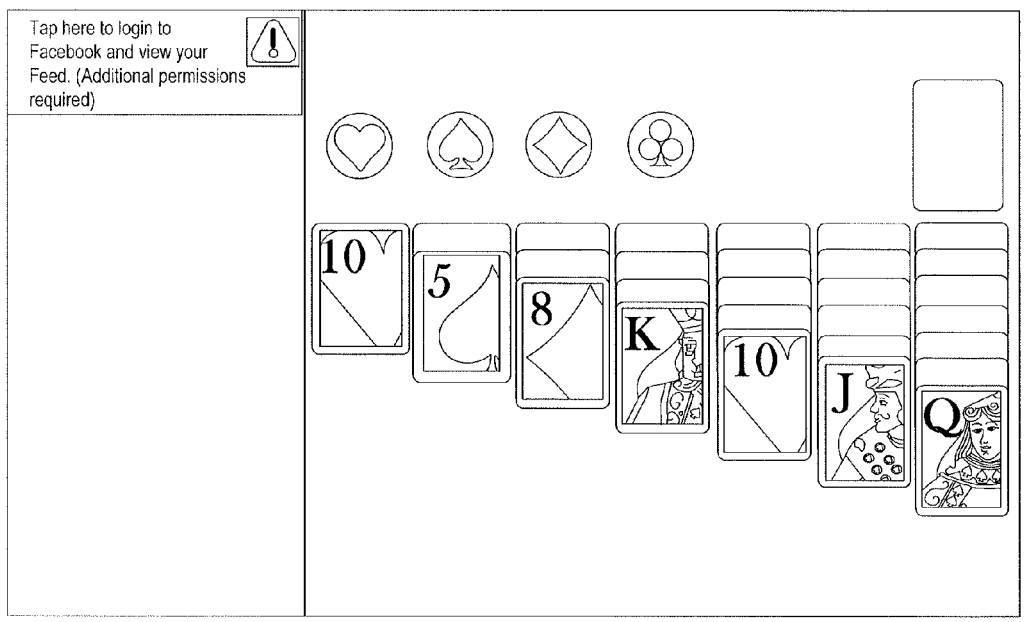

FIGS. 8A-D are exemplary graphic displays for displaying the social and other media stream to the user, consistent with the disclosed embodiments. FIGS. 8A-D show, for example, a media stream including data from Facebook; however, additional media sources may be included in the stream consistent with the disclosed embodiments. For example, FIG. 8A shows a preliminary game interface. From this view, a user 110 may play the displayed game, here solitaire. User 110 may additionally log in to a social network (e.g., Facebook) in order to have a social and other media stream displayed on the screen. The media stream is contained within the game-play interface, so a user may be able to view the stream and play the game simultaneously. Further, a user may be able to interact with the media stream by "commenting" on posts or by "liking" posts. In posts from other social media networks, additional options specific to the network may be available to the user, for example, "retweet," "follow," "share," "poke," or "favorite."

In some embodiments, certain data may be displayed in the social and other media stream or presentation whether or not user 110 is logged into any social networks or otherwise selects for the data to be presented. For example, news content (e.g., New York Times, CNN, or Glamour) may be displayed in the social and other media stream or presentation with or without user 110 logging in the news content provider or otherwise selecting for information to be displayed or presented from the news content provider. Certain embodiments may allow this list of possible news content, along with information necessary to poll the news content sources for data (URLs, for example), to be transmitted from provider server 140 to user device 120. In certain embodiments, this list of news sources may be provided in a JSON file, XML file, or any other appropriate data format. The data may be stored, for example, in memory 230. In some embodiments, user device 120 may be further configured to query the identified news sources for data. In certain embodiments, user 110 may be able to individually toggle on and off or otherwise select whether or not each news source is presented in the media stream. Further, provider server 140 may be configured to dynamically update the listing of media sources that are available for the user to select, log in to, or otherwise choose for presentation in the media stream. In some embodiments, the JSON control may be dynamic and the media stream or presentation may offer new suggestions for stream content based on the previous selections of the user.

Figure 8B:
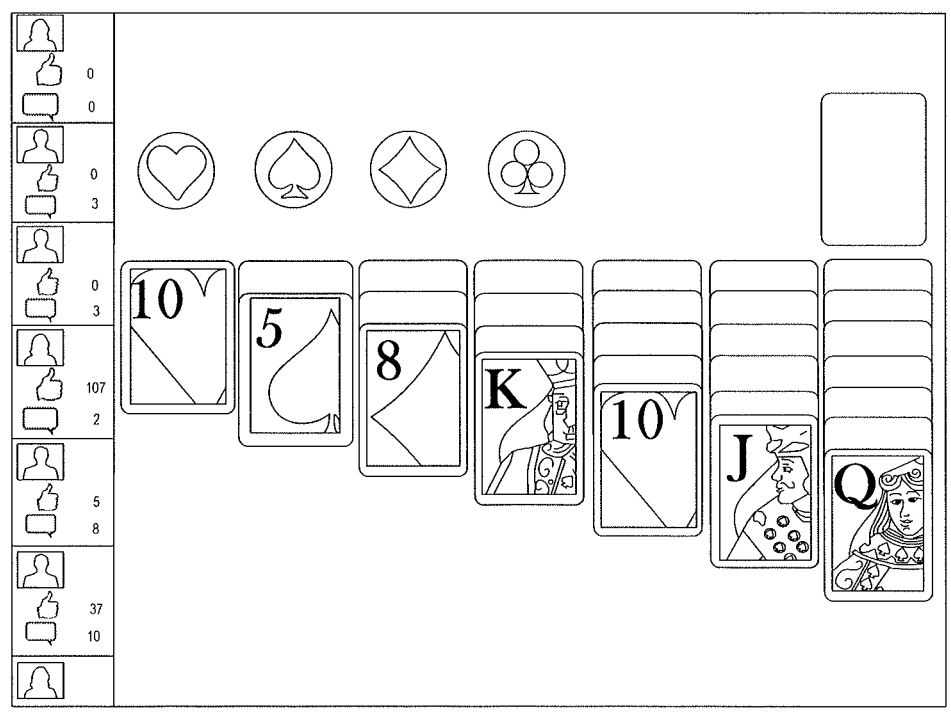

Once user 110 logs into one or more social networks, the log-in window may be replaced by the social and other media stream or presentation. For example, FIG. 8B shows an exemplary display of the social and other media stream or presentation in a "compact" view. This view takes up less of the screen allowing user 110 to see more of the game they are playing. In the social and other media stream or presentation, the user is shown only, for example, a picture signifying the person making the post to the social media network and/or the number of "likes" or "comments" on each post. The substance of the post may be hidden from view.

In some embodiments, the user may be prompted to enroll in social media networks that provide feeds of which the user is not currently a member. For example, when a user is not logged in, sample posts from social media networks may be included in the media stream in order to provide the user with an idea of how the particular network works. The user may, for example, interact with these sample posts, for example, by clicking on them. The user may be prompted by the application or by the social media network to enroll in their service. In certain embodiments, the user may be prompted by the application to enroll in social media networks without requiring user interaction. For example, upon opening the application, the user may be prompted to enroll in one or more social media networks. If the user enrolls in the social media network's service, the user may, for example, select that particular social media network for display in their media feed upon logging in, as discussed in detail above. In certain embodiments, the user may be prompted to enroll in additional social media networks after logging in. For example, after logging in to one or more social media networks, the application may detect that the user has not logged in to other social media networks. The application may, for example, prompt the user to join these additional social media networks.

Figure 8C:
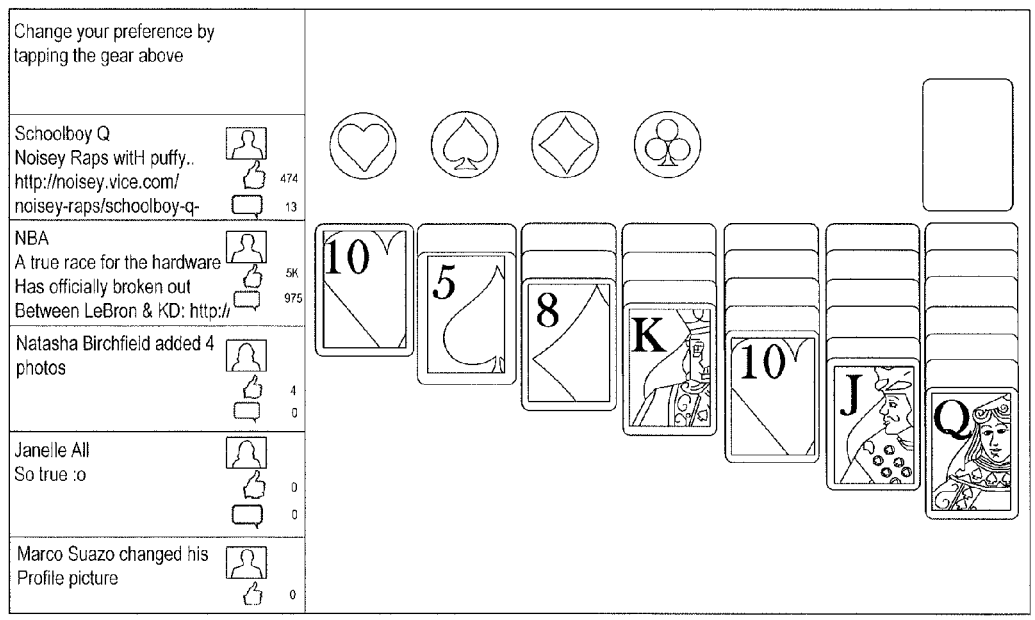

FIG. 8C shows an example of a full social and other media stream or presentation view. In this view, user 110 is able to see both the substance of the social and other media post as well as the picture signifying the person making the post and the number of "likes" or "comments" on each post; however, more of the game board is hidden behind the social and other media stream. Additionally or alternatively, the game board may be further compressed to allow full view of the media stream. A user 110 is free to select whichever view they prefer, and may interchange between them. Additionally, the game may pause when accessing the media stream or switching from "compact" to "full" view.

In certain embodiments, a "compact" view may not show the social and other media stream or presentation. For example, a badge, subtitle, or indicator may be displayed in order to indicate to the user that the social and other media stream or presentation is available for display but currently hidden.

In certain embodiments, a "full" view may include a social and other media stream or presentation that covers the entire screen of user device 120. For example, the game may be hidden from view completely. In some embodiments, the game may still be operating behind the social and other media stream or presentation. A user 110 may be able to shrink or minimize the social and other media stream or presentation in order to resume viewing and playing the game.

User 110 may also be free to click on any of the posts in the social and other media stream or presentation. Additionally, a user may be able to interact with the social media posts. For example, a user may be able to "like" or "comment on a post, and also may be able to "retweet" a post. The posts in the social and other media stream or presentation may contain links to the source of the post. When clicked on, the link will open, as shown in FIG. 8D, to display the post in its entirety. The link, however, will open within the video game interface.

Although the portion of the device showing the game board may be covered by the post, the game interface remains opened behind it. As soon as user 110 finishes with the post, they may close it and resume game play without having to switch applications on user device 120. In some examples, some or all of the logic for the above-described techniques may be implemented as a computer program or application or as a plug in module or sub component of another application. The described techniques may be varied and are not limited to the examples or descriptions provided. In some examples applications may be developed for download to mobile communications and computing devices, e.g., laptops, mobile computers, tablet computers, smart phones, etc., being made available for download by the user either directly from the device or through a website.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

Software implementing the disclosed methods or processes may be implemented in any suitable programming language, such as, for example, C, C#, C++, Objective-C, Java, Xcode, or other languages known to persons of ordinary skill in the art.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

What is claimed is:

1. A method for displaying data, the method comprising:
    displaying an application on a mobile electronic communication device;
    contacting at least one media server configured to store media data;
    receiving, at the mobile electronic communication device, first available media data from the at least one media server;
    displaying the received first available media data in a media stream within the application;
    contacting, after a predetermined amount of time, the at least one media server;
    receiving, at the mobile electronic communication device, second available media data from the at least one media server in response to the contacting after the predetermined amount of time;
    receiving the second available media data from a plurality of media servers at a particular rate;
    detecting a stream velocity of the second available media data received from each server in the plurality of servers;
    adjusting the rate at which the second available media data is received from each server in the plurality of servers based on differences between the stream velocities of each server in the plurality of servers and
    displaying the second available media data in the media stream.

2. The method of claim 1, further comprising:
    sorting the received second available media data based on at least one of chronology, popularity, relevance, or financial value; and
    buffering the sorting of the received second available media data based on the slowest stream velocity.

3. A method for displaying data, the method comprising:
    displaying a device environment on a mobile electronic communication device;
    contacting at least one media server configured to store media data;
    receiving, at the mobile electronic communication device, first available media data from the at least one media server;
    displaying the received first available media data in a media stream within the device environment;
    contacting, after a predetermined amount of time, the at least one media server;
    receiving, at the mobile electronic communication device, second available media data from the at least one media server in response to the contacting after the predetermined amount of time;
    receiving the second available media data from a plurality of media servers at a particular rate;
    detecting a stream velocity of the second available media data received from each server in the plurality of servers;
    adjusting the rate at which the second available media data is received from each server in the plurality of servers based on differences between the stream velocities of each server in the plurality of servers; and
    displaying the second available media data in the media stream.

4. The method of claim 3, further comprising:
    sorting the received second available media data based on at least one of chronology, popularity, relevance, or financial value; and
    buffering the sorting of the second available media data to account for differences in stream velocity amongst the plurality of media servers.

5. The method of claim 1, wherein the media stream is positioned at a side of the application data within the application while allowing simultaneous access to the application data.

6. The method of claim 1, further comprising:
    storing user data in a user profile;
    analyzing at least one of the first available media data and the second available media data in relation to the stored user data; and
    selecting particular media data to display based on the user data.

7. The method of claim 6, wherein the user data comprises at least one of geographic location, age, gender, type of games played, type of mobile electronic communication device, length of application use, in-app purchasing habits, win-loss ratio, time of day, day of the week, local weather, application personalization choices, and posts that have been expanded from the media stream.

8. The method of claim 1, further comprising:
storing user selections related to at least one social media network to display in the media stream; and
modifying the displayed media stream in accordance with the user selections.

9. The method of claim 1, further comprising:
displaying at least one interactive message associated with an application status;
prompting a user to post the application status to at least one social media network;
receiving an indication to post the application status to the at least one social media network; and
posting the application status to the at least one social media network.

10. The method of claim 3, wherein the media stream is positioned at a side of the device environment data within the device environment while allowing simultaneous access to the device environment data.

11. The method of claim 3, further comprising:
storing user data in a user profile;
analyzing at least one of the first available media data and the second available media data in relation to the stored user data; and
selecting particular media data to display based on the user data.

12. The method of claim 11, wherein the user data comprises at least one of geographic location, age, gender, type of games played, type of mobile electronic communication device, length of application use, in-app purchasing habits, win-loss ratio, time of day, day of the week, local weather, application personalization choices, and posts that have been expanded from the media stream.

13. The method of claim 3, further comprising:
storing user selections related to at least one social media network to display in the media stream; and
modifying the displayed media stream in accordance with the user selections.

14. The method of claim 3, further comprising:
displaying at least one interactive message associated with an application status;
prompting a user to post the application status to at least one social media network;
receiving an indication to post the application status to the at least one social media network; and
posting the application status to the at least one social media network.

* * * * *